April 3, 1956  E. R. ERVING  2,740,449
TRACTION GRIPS FOR NON-SKID TIRE CHAINS
Filed June 26, 1953
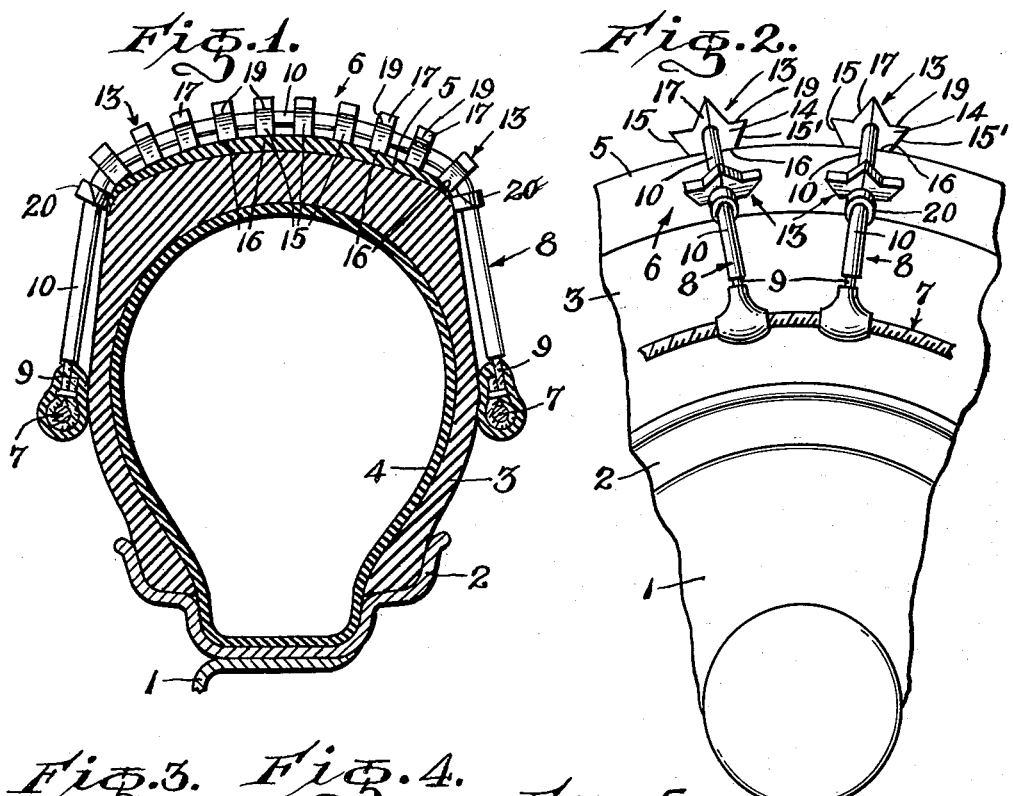
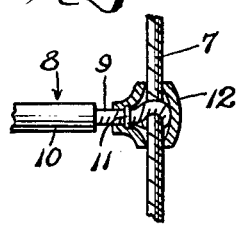
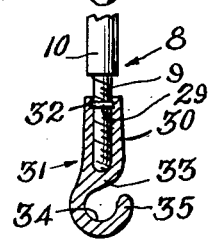
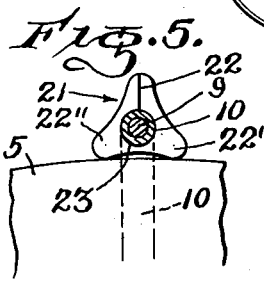
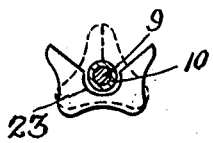
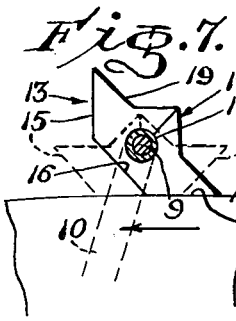
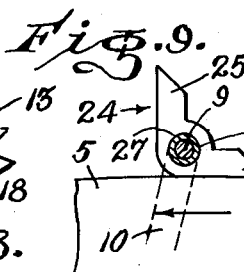
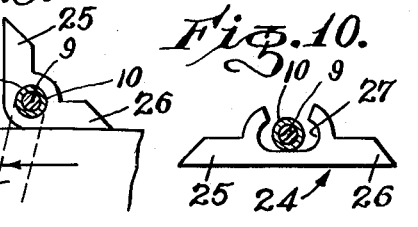
INVENTOR.
Eric Robert Erving,
BY Victor J. Evans & Co.
ATTORNEYS United States Patent Office 2,740,449
Patented Apr. 3, 1956

2,740,449

TRACTION GRIPS FOR NON-SKID TIRE CHAINS

Eric Robert Erving, Baker, Oreg.

Application June 26, 1953, Serial No. 364,273

1 Claim. (Cl. 152—239)

This invention relates to an attachment for land vehicle wheels, and more specifically, to safety or traction devices detachably secured to land vehicle wheels or tires.

A primary object of this invention is to provide a land vehicle tire chain having an optimum degree of traction under all types of adverse road conditions whereby complete control of rapidly moving light, or slower moving heavier vehicles, is maintained at all times. In carrying out this object of the invention, it is proposed to utilize a tire chain which is lighter in weight, more durable in use, and less complicated to attach and to detach, than the tire chains heretofore known in the art.

Another object of this invention is to provide a cross-link, including traction grips therefor, for tire chains of the type described, which is light in weight and highly resistant to strains and stresses.

A further object of this invention is to provide in a tire chain of the type described, traction grips and links which may be easily repaired or replaced, and which may be substituted for, or used in addition to, tire chains employing other types of cross-links and traction grips.

It is a still further object of this invention to provide a tire chain which is non-complex in construction, and inexpensive to manufacture and maintain.

Other and further objects and advantages of this invention will become more apparent from a consideration of the following specification when read in the light of the annexed drawing, in which:

Fig. 1 is a cross-sectional view taken on a vertical plane passing transversely through a conventional automobile wheel and tire, and illustrating in side elevation a cross-link and traction grips therefor constructed in accordance with this invention;

Fig. 2 is a partial side elevation of the disclosure of Fig. 1;

Fig. 3 is a detail cross-sectional view illustrating one means for connecting the ends of the cross-links with the side members of the tire chain;

Fig. 4 is a detail cross-sectional view showing a second means for connecting the cross-links with the side members of the tire chain;

Fig. 5 is a side elevation of a modified form of traction grip;

Fig. 6 illustrates the mode of application of the traction grip of Fig. 5 to the cross-link of a tire chain;

Fig. 7 is a side elevation of the traction grip shown in Figs. 1 and 2, the grip being shown as turned to the position it assumes when the tire loses traction with the road and spins in the direction of the arrow;

Fig. 8 illustrates the manner of application of the traction grip shown in Figs. 1, 2 and 7 to the cross-link of a tire chain;

Fig. 9 discloses a further modification of the traction grip; and,

Fig. 10 illustrates the manner in which the traction grip of Fig. 9 is applied to a cross-link of a tire chain.

Referring now more specifically to Figs. 1 and 2 of the drawing, reference numeral 1 designates a conventional automobile wheel having a substantially U-shaped tire rim 2 rigidly secured thereto, with a conventional tire casing 3 equipped with an inflatable tube 4 therein, the casing together with its tube being detachably mounted on the rim. The tire casing 3 is constructed with the usual tread portion denoted at 5.

The tire chain 6 to which this invention pertains includes a pair of spaced wire cable side members 7 which extend circumferentially around opposed sides of the tire casing 3. In accordance with this invention each cable side member is formed of spun or twisted wire to obtain a cable which will withstand high tensional forces, is light in weight, and relatively inexpensive to manufacture.

As shown in these figures, the cable side members 7 are connected with the opposite ends of a plurality of cross-links generally designated by the reference numeral 8, the cross-links being adapted to traverse the tire tread 5 at spaced intervals. Each of the cross-links 8 comprises a central core or cable 9 which is also formed of spun or twisted wire to obtain the advantages noted above in connection with the construction of the side members 7.

Each cross-link 8 is provided with a cover 10 formed of rubber, plastics, or other suitable similar materials, which serves to prevent the cross-links 8 from gouging the sides of the tire casing 3 should the tire chain be inadvertently tightened too snugly.

As seen in Figs. 1 to 4, inclusive, the opposite ends of the cross-link cables 9 are devoid of the covering material 10 to facilitate connection thereof with the side members 7 of the tire chain of this invention or, as will be seen, to enable the cross-links 8 to be connected with the side members of other types of tire chains. Preferred modes of accomplishing this connection are illustrated in Figs. 3 and 4, to which detailed reference will now be made.

In Fig. 3 the connection between the ends of the cables 9 with their adjacent side members 7 is achieved by lapping the ends of the cables 9 around the side members 7 and bringing the free ends of the cables 9 into juxtaposition with the standing end portions thereof. The standing and free ends thereof are then encircled and secured together by a band of wire 11. Thereafter, a T-connector 12 is placed over the juncture of the cross-links 8 with their respective side members 7 and is die-cast thereabout to form a bond or covering therefor, and to fixedly secure the connections.

The tire chain is completed by the addition of traction grips to the cross-links 8. In Figs. 1, 2, 7 and 8, one form of traction grip has been illustrated which has been found highly satisfactory in use with relatively fast and light weight automotive vehicles. In this embodiment of the invention, the traction grip member is indicated, in general, by the reference numeral 13, and comprises a horizontally elongated main body portion 14 having opposed ends 15, 15' thereof converging toward and intersecting the lower side 16 at equal angles of inclination. A substantially triangular node 17 is formed integrally with the main body portion 14 and projects laterally away from the upper side 19 intermediate its ends. The main body portion 14 is also provided with an aperture 18 extending transversely therethrough with its axis substantially perpendicular to the longitudinal axis of the body portion 14, the aperture 18 being positioned intermediate the ends 15, 15' and substantially tangent to the plane of the upper side 19. The node 17 is severed in a plane which passes through the apex thereof, bisects its base, and passes diametrically through the aperture 18. Thus, each side of the traction grip member is symmetrical with respect to this plane.

As is seen in Figs. 1 and 2, the cross-link 8 is provided with a plurality of spaced traction grip members 13 which are secured thereon by first opening (see Fig. 8) the members 13 along the line of their severance and inserting the cross-link in the aperture 18, and thereafter closing the members 13 thereabout, as shown in Fig. 7. The diameter of the aperture 18 is made smaller than the outside diameter of the covering 10 so that in closing the traction grip member 13 about the cross-link 8, the traction grip members are tightly crimped thereon.

Split lock rings 20 are crimped to the cross-link 8 adjacent each end traction grip member 13 to prevent shifting thereof longitudinally of the cross-link 8.

If desired, the traction grip members may be spot welded or otherwise secured along the line of severance, though this is generally unnecessary as the adjacent portions thereof are normally held in closed position as the pressure thereon while driving tends to force the severed portions together.

In operation, if the vehicle wheel loses traction and begins to spin, or if the wheel skids as a result of the heavy application of the vehicle brakes, the traction grips 13 turn, as seen in Fig. 7, from their normal substantially horizontal shown in dotted lines to the solid line position. Thus, the raised end portion of the traction members as well as the node thereof are presented for ground engagement.

Fig. 5 illustrates the construction of a modified traction grip member 21 which has a sprocket-like configuration including the three lobes 22, 22' and 22'', of which, the lobe 22 is severed or split with the plane of the severance passing through a diameter of a centrally positioned transversely extending aperture 23. The application of traction grips of this type to the cross-link 8 is identical (see Figs. 5 and 6) to that described above in connection with the traction grip members 13.

Traction grip members of the type shown in Figs. 5 and 6 are admirably suited for use with heavy equipment, such as tractors, as they produce a great amount of traction without clogging or filling up with mud or snow.

In Figs. 9 and 10, a further modification of the traction grip members has been disclosed. These traction grip members 24 are especially designed for use with trucks and other rather slow moving vehicles where a positive grip is required. In this case, the member 24 is substantially L-shaped in configuration, having leg and foot portions 25 and 26. The member 24 is formed with a transverse aperture 27 at the juncture of the leg with the foot portion, and is split in a plane containing a diameter of the aperture 27, and which substantially bisects the angle between the leg and foot portions.

Here again, the application of the traction member 24 to the cross-link 8 is the same as has been set forth above in the discussion of traction grip member 13.

In this construction, if the wheel is reversed or brought to a sudden stop, the traction grip will tip over, bringing either of the pointed ends thereof into contact with the road surface, making positive traction possible regardless of the turning direction of the wheel.

The various types of traction grips referred to above have been described in connection with cross-links which have their ends relatively permanently secured to the side members. It is to be understood, however, that the construction is such as to permit the detachment of the cross-links for repair or substitution without involving considerable labor and high expenditures. If desired, a modified connecting means such as is illustrated in Fig. 4 could be employed. In this case, the free end of the cable 9 is looped and brought into juxtaposition with the standing portion thereof to form a bight. The standing and free ends of the cable 9 are then secured together by a wire ring 29, and the bight is then inserted into the hollow end portion 30 of an elongated hook 31. The end portion 30 is internally grooved at 32 to receive the wire ring 29, and when the same is seated therein the end portion is compressed. To mount a cross-link so constructed on the side members 7, the side members are passed through the throat 33 into the opening 34 and the hook arm 35 is then crimped thereabout.

Having described this invention in detail, it will be understood that the embodiments herein disclosed are offered by way of example, and that the invention is only to be limited by the scope of the following claim.

I claim:

In a tire chain, a pair of spaced parallel wire cable side members, a plurality of cross links extending between said side members and each including a cable having a main portion and end portions, a cover mounted on each of the main portions of said cables and said cover terminating short of the end portions of said cables, the end portions of said cables extending around said side members and the free end portions of said cables being secured to said main portions of the cable, a T-connector arranged over the juncture of the cross links with said side members, and a plurality of traction grips movably mounted on said cross links and each including a main section provided with ground engaging projections, there being openings in said traction grips for receiving said cross links, the diameter of said openings being smaller than the diameter of said cover so that the traction grips are crimped on the cover, and split lock rings secured to said cross links adjacent each end traction grip.

References Cited in the file of this patent

UNITED STATES PATENTS

| Re. 16,680 | Hoff | July 19, 1927 |
| 1,533,679 | Webster | Apr. 14, 1925 |
| 1,785,117 | Fonferek | Dec. 16, 1930 |
| 1,830,556 | Nelson | Nov. 3, 1931 |
| 2,252,027 | Pasquarella | Aug. 12, 1941 |
| 2,280,555 | Sterner | Apr. 21, 1942 |
| 2,346,477 | Ederer | Apr. 11, 1944 |
| 2,438,248 | Madison | Mar. 23, 1948 |
| 2,498,523 | Bergen | Feb. 21, 1950 |
| 2,657,727 | Peterson | Nov. 3, 1953 |